(12) United States Patent
Kunjan et al.

(10) Patent No.: US 7,519,755 B2
(45) Date of Patent: Apr. 14, 2009

(54) COMBINED COMMAND AND RESPONSE ON-CHIP DATA INTERFACE FOR A COMPUTER SYSTEM CHIPSET

(75) Inventors: Thomas Kunjan, Dresden (DE); Joerg Winkler, Ullersdorf (DE); Frank Barth, Radebeul (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 609 days.

(21) Appl. No.: 10/964,884

(22) Filed: Oct. 14, 2004

(65) Prior Publication Data

US 2006/0015667 A1  Jan. 19, 2006

(30) Foreign Application Priority Data

Jun. 30, 2004 (DE) .................. 10 2004 031 715

(51) Int. Cl.
 *G06F 13/00* (2006.01)
(52) U.S. Cl. .................................... 710/112
(58) Field of Classification Search ......... 710/306, 710/100, 313, 107, 305, 112; 370/257, 464; 712/32, 36; 361/683, 686; 700/1; 709/227
See application file for complete search history.

(56) References Cited

U.S. PATENT DOCUMENTS

| | | | | |
|---|---|---|---|---|
| 3,073,907 A * | 1/1963 | Alterman et al. | ............ | 379/384 |
| 3,177,293 A * | 4/1965 | Duncan et al. | ............. | 379/306 |
| 3,470,542 A * | 9/1969 | Trantanella | ............ | 365/230.03 |
| 4,271,465 A * | 6/1981 | Ohtsuka et al. | ............. | 710/119 |
| 5,228,139 A * | 7/1993 | Miwa et al. | .................... | 714/27 |
| 5,313,591 A * | 5/1994 | Averill | ....................... | 710/119 |
| 5,509,125 A * | 4/1996 | Johnson et al. | ............. | 710/120 |
| 5,546,546 A * | 8/1996 | Bell et al. | .................... | 710/112 |
| 5,581,698 A * | 12/1996 | Miwa et al. | .................... | 714/42 |
| 5,606,717 A * | 2/1997 | Farmwald et al. | ............. | 710/36 |
| 5,805,883 A * | 9/1998 | Saitoh | ........................ | 718/105 |
| 6,347,351 B1* | 2/2002 | Osborne et al. | ............. | 710/119 |
| 6,785,753 B2* | 8/2004 | Weber et al. | ................. | 710/105 |
| 6,894,935 B2 | 5/2005 | Peel et al. | | |
| 6,903,574 B2 | 6/2005 | Chen et al. | | |
| 6,907,493 B2 | 6/2005 | Ryan | | |
| 6,928,519 B2* | 8/2005 | Cypher | ....................... | 711/141 |

(Continued)

OTHER PUBLICATIONS

"Stochastic performance guarantees for mixed workloads in a multimedia information system" by Nerjes et al. (abstract only) Publication Date: Apr. 7-8, 1997.*

(Continued)

*Primary Examiner*—Paul R Myers
(74) *Attorney, Agent, or Firm*—Meyertons Hood Kivlin Kowert & Goetzel, P.C.; Erik A. Heter

(57) ABSTRACT

An integrated circuit chip, particularly a southbridge, is provided that has a first and a second circuit unit. Each circuit unit can send requests to the other one and send back a response when receiving a request that requires a response. The first circuit unit is connected to the second circuit unit to send to the second circuit unit request data relating to a request to be sent by the first circuit unit and response data relating to a response to be sent by the first circuit unit over a shared signal line.

59 Claims, 11 Drawing Sheets

U.S. PATENT DOCUMENTS

| | | | |
|---|---|---|---|
| 7,085,866 B1* | 8/2006 | Hobson et al. | 710/117 |
| 7,165,094 B2* | 1/2007 | Weber et al. | 709/207 |
| 7,181,558 B2* | 2/2007 | Endo et al. | 710/107 |
| 2005/0144369 A1* | 6/2005 | Jaspers | 711/105 |
| 2006/0015667 A1* | 1/2006 | Kunjan et al. | 710/107 |

OTHER PUBLICATIONS

Translation of Office Action application No. DE 10 2004 031 715.1-53 mailed Mar. 1, 2005.

Messmer, "PC-Hardwarebuch", 5$^{th}$ edition, Addison-Wesley, 1997, pp. 484 and 622.

Hans-Peter Messmer, PC-Hardwarebuch, 5th edition, Addison-Wesley, 1997, pp. 601, 607, 608.

Intel 440BX AGPset: 82443BX Host Bridge/Controller, Datahseet, Apr. 1998, Order No. 290633-001, pp. 3-4 and 3-5.

Translation of Official Communication of German Application No. 10 2004 031 715.1-53, Issued Jun. 4, 2007.

* cited by examiner

US 7,519,755 B2

COMBINED COMMAND AND RESPONSE ON-CHIP DATA INTERFACE FOR A COMPUTER SYSTEM CHIPSET

BACKGROUND OF THE INVENTION

1. Field of the Invention

The invention generally relates to on-chip data interfaces and in particular to integrated circuit chips having circuit units that may interchange requests and responses.

2. Description of the Related Art

Integrated circuit chips are often used for data processing and are known to comprise a number of different circuit units. Generally, each circuit unit is for performing a specific function, and of course there may be different circuit units provided on one chip for performing the same function or performing different functions. The circuit units may operate sequentially or simultaneously and they may function independently from each other or dependent on the operation of other circuit units.

In the latter case, the circuit units are usually interconnected via an interface to allow the circuit units to interchange data needed for making the operation of one circuit unit dependent on the operation of the other circuit unit. The data exchange is often done by sending transactions from one circuit unit to the other circuit unit. A transaction is a sequence of packets that are exchanged between the circuit units and that result in a transfer of information. The circuit unit initiating a transaction is called the source, and the circuit unit that ultimately services the transaction on behalf of the source is called the target. It is to be noted that there may also be intermediary units between the source and the target.

Transactions may be used to place a request or to respond to a received request. Taking the requests, posted requests may be distinguished from non-posted requests dependent on whether the request requires a response. Specifically, a non-posted request is a request that requires a response while a posted request does not require a response.

When focusing on the functions which are performed by the interconnected circuit units, the circuit units can often be divided into hosts and devices. The term host then means a circuit unit that provides services to the dependent device. A transaction from the host to the device is said to be downstream while a transaction in the other direction is said to be upstream. In bidirectional configurations, both the host and the device may send and receive requests and responses so that a device may be a source as well as a target, and the host may also function as a source as well as target.

A field where such integrated circuit chips are widely used are personal computers. Referring to FIG. 1, the hardware components of a common motherboard layout are depicted. It is to be noted that this figure shows only one example of a motherboard layout, and other configurations exist as well. The basic elements found on the motherboard of FIG. 1 include the CPU (Central Processing Unit) 100, a northbridge 105, a southbridge 110, and system memory 115. The northbridge 105 is usually a single chip in a core logic chip set that connects the processor 100 to the system memory 115 and, e.g., to the AGP (Accelerated Graphic Port) bus. Often a proprietary (or public) interface is provided between the processor 100 and northbridge 105 like, e.g. Athlon's proprietary FSB (Front Side Bus) EV6, the proprietary FSB (hublink) of Pentium 4, or Opteron's Hypertransport.

The southbridge 110 is usually the chip in a system core logic chip set that controls the IDE (Integrated Drive Electronics) or EIDE (Enhanced IDE) bus. The USB (Universal Serial Bus) that provides plug-n-play support manages the keyboard/mouse controller, provides power management features, and controls other peripherals. Common peripheral interfaces are, e.g. USB 2.0, EIDE, and SATA (Serial Advanced Technology Attachment).

FIG. 2 shows the components of a typical prior art southbridge. Of course, only a design example is illustrated in FIG. 2, and other arrangements exist as well. The device comprises a host circuit 210 and a device circuit 230. The host circuit 210 is connected by a chip-to-chip interface 200 to a northbridge or to another integrated circuit chip such as a memory controller or processor. On the other side, the southbridge includes a chip-to-peripheral interface 240 to connect the device circuit 230 to the peripherals. Further, there is an on-chip interface 220 provided between the host circuit 210 and the device circuit 230. This on-chip interface is usually a split transaction interface. Split transaction interfaces are interfaces where requests and responses are transferred on the bus as completely decoupled and independent transactions.

An example of a split transaction interface is shown in FIG. 3. Usually, a split transaction interface has two components: a target interface and a source interface. The target interface is the interface where requests (also denoted as "commands") are sent downstream, i.e. from the host 300 to the device 345, and responses are sent upstream. On the other hand, the source interface is the interface where requests are sent upstream and responses downstream. For reasons of clarity, only the downstream parts of the interface are shown in FIG. 3.

In addition to the partitioning into the target and source interfaces, a split transaction interface is usually further split up into command interface units 305, 335 and response interface units 310, 340. While the command interface unit 305 of the host 300 is connected to the command interface unit 335 of the device 345 by multiple command signal lines 315, 320, the response interface unit 310 of the host 300 is connected to the response interface unit 340 of the device 345 by a number of response signal lines 325, 330. In particular, the command signal lines include a command transfer request signal line 315 over which the host 300 provides the device 345 with a command transfer request signal indicating that the host 300 is sending a command, and one or more command data signal lines 320 over which the data forming the command are sent. Accordingly, the response signal lines include a response transfer request signal line 325 and one or more response data signal lines 330.

While such a split transaction interface provides high speed data transport, this design suffers from the need for a large number of wires to implement the separated command interface units 305, 335 and response interface units 310, 340. Therefore, usual split transaction interfaces have the disadvantage of low design density and efficiency and thus increased manufacturing costs.

SUMMARY OF THE INVENTION

An improved on-chip interface is therefore provided that may allow for increasing the overall architecture density and the efficiency and that may reduce the product costs.

In one embodiment, an integrated circuit chip is provided that comprises a first and a second circuit unit. Each of the first and second circuit units are capable of sending requests to the other one of the first and second circuit units. Further, each of the first and second circuit units are capable of sending back a response when receiving a request that requires a response. The first circuit unit is connected to the second circuit unit to send to the second circuit unit request data relating to a request to be sent by the first circuit unit and response data relating to a response to be sent by the first circuit unit over a shared signal line.

In another embodiment, there may be provided a southbridge device that comprises an integrated circuit chip having a first and a second circuit unit. Each of the first and second circuit units are capable of sending requests to the other one of the first and second circuit units. Further, each of the first and second circuit units are capable of sending back a response when receiving a request that requires a response. The first circuit unit is connected to the second circuit unit to send to the second circuit unit request data relating to a request to be sent by the first circuit unit and response data relating to a response to be sent by the first circuit unit over a shared signal line.

In a further embodiment, a method of operating an integrated circuit chip that comprises a first and a second circuit unit is provided. The method comprises sending requests from one of the first and second circuit units to the other one of the first and second circuit units and sending back a response from the other one of the first and second circuit units to the one of the first and second circuit units if the request requires a response. The method further comprises operating the first circuit unit to send to the second circuit unit request data relating to a request to be sent by the first circuit unit and response data relating to a response to be sent by the first circuit unit over a shared signal line.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
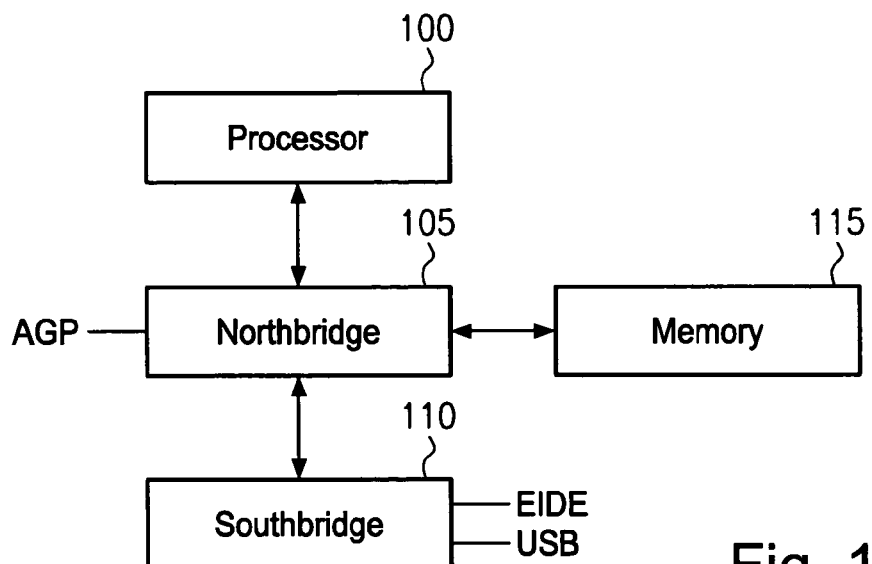
FIG. 1 illustrates a common motherboard layout.
Figure 2:
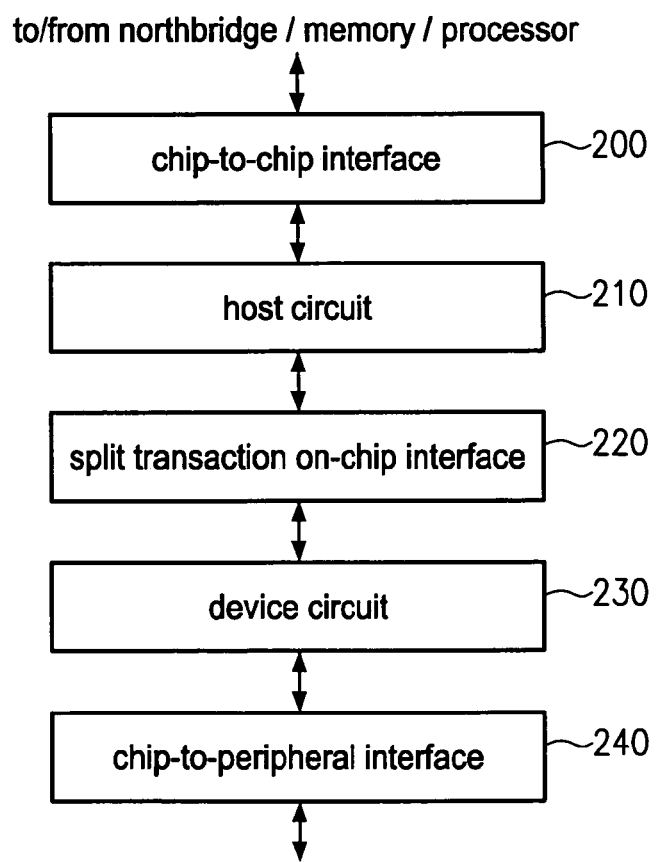
FIG. 2 illustrates a southbridge according to prior art.
Figure 3:
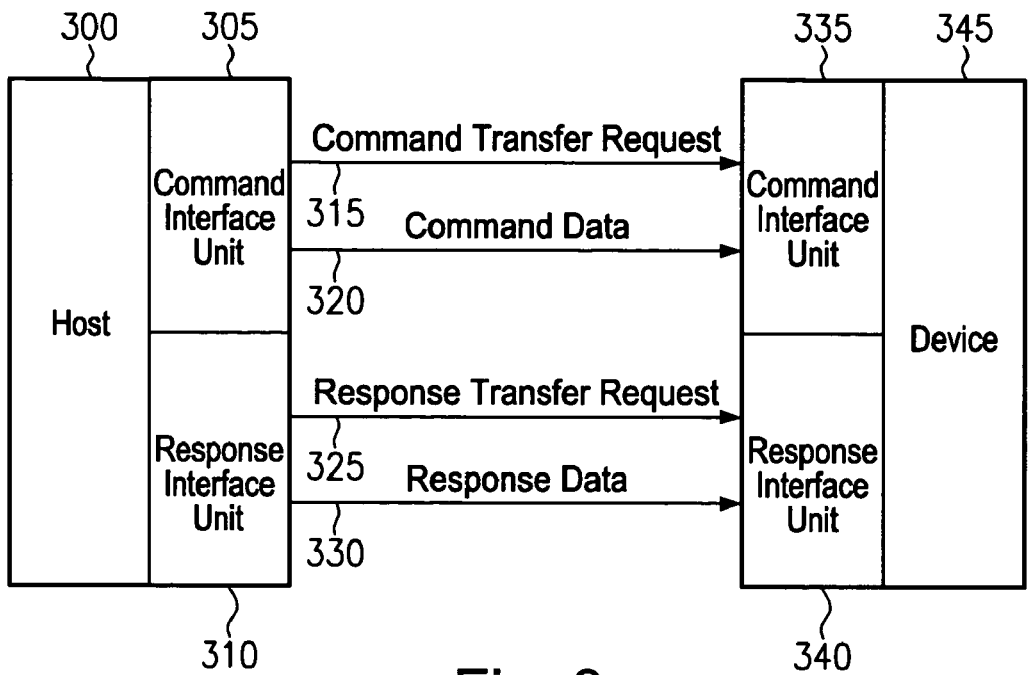
FIG. 3 illustrates an on-chip interface according to prior art.
Figure 4:
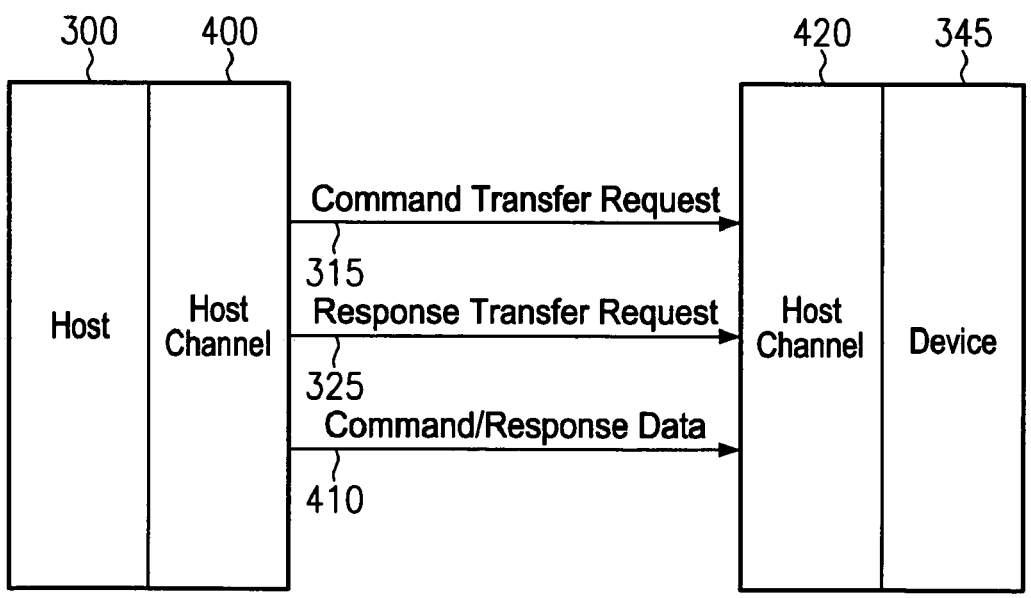
FIG. 4 illustrates an on-chip interface according to an embodiment.

Referring now to the drawings, and particularly to FIG. 4 which illustrates an on-chip interface according to an embodiment, the device comprises a host circuit 300 and a device circuit 345 which are connected to each other over a number of signal lines 315, 325, 410. In comparison to FIG. 3 which shows an on-chip interface according to prior art, the downstream command and response interface units have been merged to build the host channel 400, 420. In the host channel 400, 420 there may be provided a shared command/response data signal line 410 over which both command data forming a host command, i.e. a command to be sent downstream from the host 300 to the device 345, and response data forming a host response, i.e. a response to be sent downstream, may be sent from the host 300 to the device 345.

According to the present embodiment, the host 300 buffers host commands before decoding and forwarding them to the respective host channel 400, 420. Also device responses, i.e. responses to host commands, may be buffered by the host 300. Therefore, the device 345 may be allowed to delay or pause the transmission of host requests and may further be allowed to split up the transmission of a device response. Further, the host 300 may be allowed to pause the transmission of host commands and device responses.

On the other hand, the device 345 may buffer device commands and host responses, i.e. responses to device commands. In particular, the host 300 may forward all incoming host responses to the device 345, and it may be to the responsibility of the device 345 to provide sufficient buffer space for the host responses. Therefore, the device 345 may not be allowed to pause the transmission of device commands or to delay or pause the transmission of host responses, while the host 300 may be allowed to pause the transmission of device commands and host responses. Moreover, the host 300 may be allowed to pause the transmission of a host command in order to transmit a host response. Host responses may return out of order. It may be to the responsibility of the device 345 to reorder the host responses if necessary.

It is to be noted that in FIG. 4, only downstream interfaces and data lines are shown for reasons of clarity. In addition to the depicted host channel 400, 420, a device channel may also be provided for managing device requests and device responses sent upstream from the device 345 to the host 300 to which the presented techniques may similarly apply. For simplifying the discussion, host requests (commands) and host responses will be denoted in the following as "requests" ("commands") and "responses", respectively.

In the present embodiment, there may be two types of commands: read commands and write commands. For both types of commands, a command transmission may consist of an ordered sequence of phases: while for a read command, an address phase may be followed by one byte enable phase, for a write command, an address phase followed by one or multiple data phases may be transmitted. A response transmission may consist of one or multiple data phases.

According to the embodiment, the commands and responses have individual transaction enable signals, i.e. a command transfer request signal and a response transfer request signal, that may be sent from the host 300 to the device 345 over the command transfer request signal line 315 and the response transfer request signal line 325, respectively. The assertion of those enable signals may determine the type of the current transactions, i.e. whether the host 300 is sending a command or a response.

The device 345 may comprise a command FSM (Finite State Machine) unit and a response FSM unit for processing commands and responses, respectively. The command transfer request signal line 315 may be connected to the command FSM unit and the response transfer request signal line 325 may be linked to the response FSM unit, while the shared command/response data signal line 410 may be coupled to both the command FSM unit and the response FSM unit.

Figure 5:
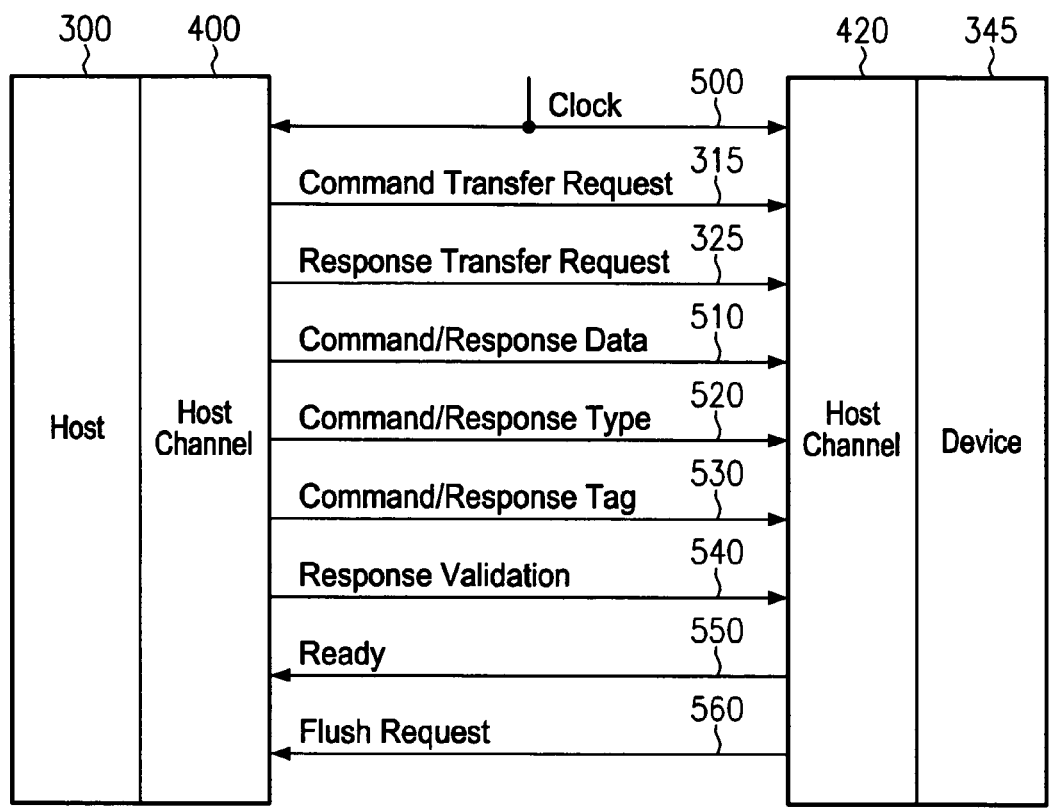
FIG. 5 illustrates the on-chip interface of FIG. 4 in more detail.

Turning now to FIG. 5, a more detailed view of the on-chip interface according to the present embodiment is provided. As already indicated with respect to FIG. 4, the host channel 400, 420 may transfer commands and responses from the host 300 to the device 345. According to the present embodiment, both transactions are multiplexed on the same data bus comprising a shared command/response data signal line 510, a shared command/response type signal line 520, and a shared command/response tag signal line 530.

During the address phase of a command, the data bus may hold the following information: a request address on the command/response data signal line 510, a request type on the command/response type signal line 520, and a request tag on the command/response tag signal line 530 in case of a non-posted request. For a posted request, the command/response tag signal may stay unchanged.

During the byte enable phase of a read command, the command/response data signal line 510 may hold byte enables for the first dword and/or byte enables for the last dword in case of a burst. Further, during the byte enable phase, the command/response type signal line 520 may hold host request information bits and the command/response tag signal line 530 may hold the number of dwords to read minus one.

While a data phase of a write command is transmitted, the data bus may hold a dword of write data on the command/response data signal line 510, byte enables for the current write data on the command/response type signal line 520, and numbers of dwords still to write in subsequent data phases on the command/response tag signal line 530. The value on the command/response tag signal line 530 may reach zero with the last data phase of the write command.

In addition to the shared signal lines 510, 520, 530, the host 300 may further be connected to the device 345 over a command transfer request signal line 315 and a response transfer request signal line 325 which have already been introduced when discussing FIG. 4. While the command transfer request signal being asserted may indicate that the data bus holds command data, the response transfer request signal being asserted may indicate that the bus holds response data.

According to the present embodiment, the transmission of commands and responses can be interleaved, i.e. the command transfer request signal and the response transfer request signal can be asserted alternately. The command transfer request signal and the response transfer request signal may not be set at the same time. When both the command transfer request signal and the response transfer request signal are de-asserted, the host channel 400, 420 may be idle. When the host channel 400, 420 enters or is in the idle state, the data bus signals may not change.

There may be a clock signal externally provided to the host 300 and the device 345 over the clock signal line 500. When the host channel 400, 420 is in the idle state, this clock signal might be gated.

A ready signal line 550 may allow the device 345 to communicate to the host 300 that it is ready for receiving command data: according to the present embodiment, the device 345 must set the ready signal on the ready signal line 550 when it is able to accept the next command phase. Once the ready signal is asserted, it must not de-assert it before the device 345 samples the command transfer request signal asserted. Further, the device 345 must not make the state of the ready signal dependent on the state of the command transfer request signal.

Thus, the device 345 may be allowed to pause or delay the transmission of a command by unsetting the ready signal. On the other hand, according to the present embodiment, the device 345 cannot pause the transmission of a response.

Command data may be transferred and the transmission of command data may proceed to the next phase at a rising clock edge when both the command transfer request signal and the ready signal are asserted. On the other hand, response data may be transferred and the transmission of response data may proceed to the next phase at a rising clock edge when the response transfer request signal is asserted, independently of the state of the ready signal.

The device 345 may have the possibility to flush outstanding data phases by setting a flush request signal on the flush request signal line 560 instead of the ready signal. When both the command transfer request signal and the flush request signal are asserted, no command data may be transferred and the command data transmission may complete at a rising clock edge. According to the present embodiment, the device 345 must only set the flush request signal during a data phase of a write command. The flush request signal and the ready signal must not be asserted at the same time. Once the flush request signal is asserted, it must stay asserted until the device 345 samples the command transfer request signal asserted. In order to quickly terminate a command data transmission, the host 300 may set the command transfer request signal immediately after sampling the flush request signal asserted without placing valid data onto the data bus.

Once the host 300 has asserted the command transfer request signal, it may not de-assert it until it samples the ready signal asserted and proceeds to the next command phase or it sets the response transfer request signal to transmit an interleaved response. In the present embodiment, the host 300 must reassert the command transfer request signal in the same clock cycle with the de-assertion of the response transfer request signal.

The transmission of a command may be paused after each transmitted phase by the host 300 by unsetting the command transfer request signal or by the device 345 by unsetting the ready signal. After the last data phase of a command transmission, the host 300 may be allowed to start a new transmission in the next clock cycle by keeping the command transfer request signal asserted to start another command back-to-back or by de-asserting the command transfer request signal and asserting the response transfer request signal to start a response. According to the embodiment, the host 300 must not transmit other commands before the transmission of a current command is completed.

During a data phase of a response, the data bus may hold a dword of response data on the command/response data signal line 510 in case of a response with data, i.e. a successful read response. In all other cases, i.e. non-successful or write responses, the command/response data signal may stay unchanged. Further, the bus may hold during the response data phase a response status indicating whether the data phase is the last data phase of the current response on the command/response type signal line 520 and a response tag on the command/response tag signal line 530. The command/response tag signal may stay unchanged in all data phases of the response transmission.

According to the present embodiment, once the host 300 has asserted the response transfer request signal, it must not de-assert it until it has completed the transmission of the response, or it asserts the command transfer request signal to transmit an interleaved command, or it wants to pause the transmission of a response. After the last data phase of a response transmission, the host 300 may be allowed to start a new transmission in the next clock cycle by keeping the response transfer request signal set to start a response back-to-back, or by de-asserting the response transfer request signal and asserting the command transfer request signal to start a command. The host 300 may not be allowed to transmit other responses before the transmission of the current response is completed.

A response may be considered to be valid when a regarding response validation signal is set on the response validation signal line 540. If the device 345 is required to obey the ordering rules, it may not use the response until it is valid. The device 345 may not make the acceptance of any posted or non-posted command contingent upon the prior reception of any response.

The host 300 may be allowed to set the response validation signal independently of the state of the response transfer request signal. For example, the host 300 may assert the response validation signal at the start of a response transmission or later. The host 300 may assert multiple response validation signals at the same time. Once asserted, the host 300 may keep the response validation signal asserted until the transmission of another response with the same tag starts.

According to the present embodiment, there may be split responses being responses with data which do not contain all the data requested from the host 300. Split responses which belong to the same device request may bear the same tag, i.e. the tag of the device request. In this embodiment, split responses pertaining to the same device request must be transferred in order.

The host 300 may be allowed to transmit other commands or responses between split responses belonging to the same device request.

The device 345 may be allowed to use split responses before receiving all data requested from the host 300. According to the embodiment, a successful split response transfers a response status indicating whether it completes the data requested from the host 300 on the command/response type signal line 520. After a split response with a response status other than the status indicating that it does not complete the data requested from the host 300, no more split responses which belong to the same device request follow. When the device 345 receives a split response with a response status other than the one indicating whether it completes the data requested from the host 300, it may treat the whole response as a non-successful response with the same response status code. It is to be noted that data of previous split responses which belong to the same device request and were transferred with a response status indicating that they do not complete the data requested from the host 300 may be used by the device 345.

Figure 6:
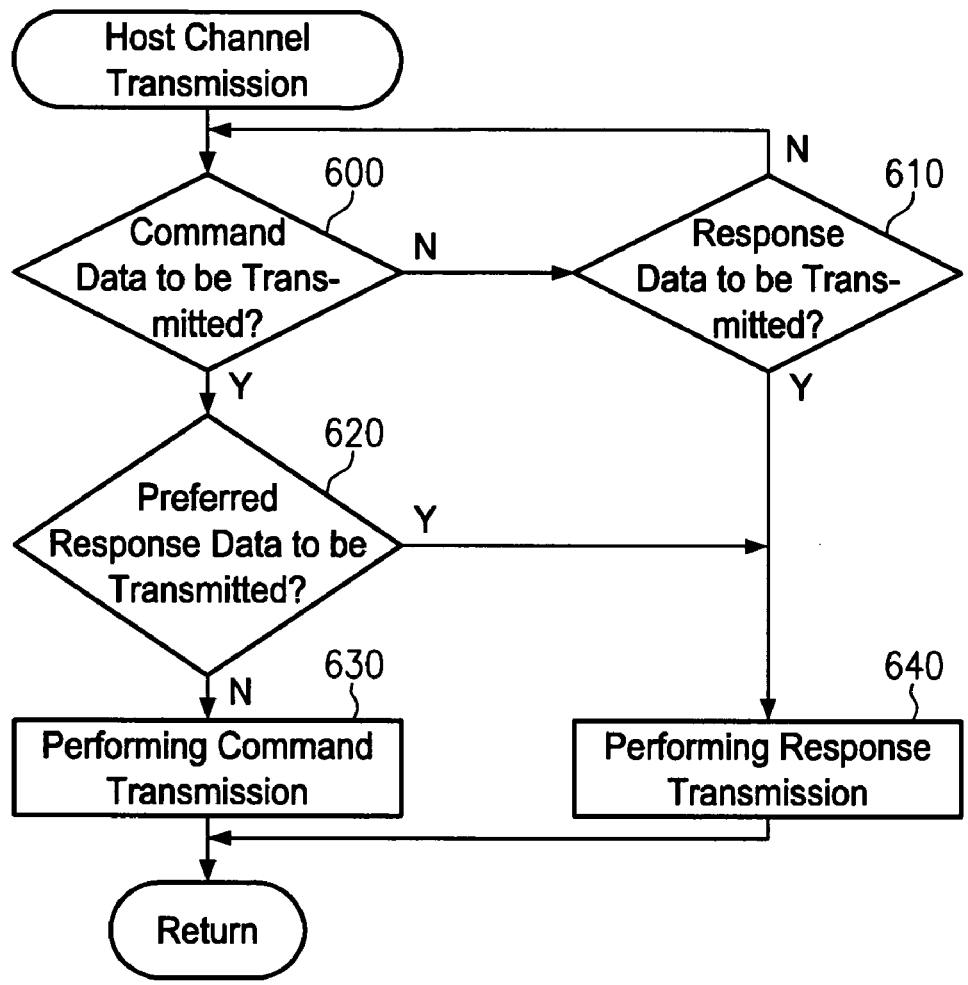
FIG. 6 is a flow chart illustrating the process of performing downstream transmission using the on-chip interface shown in FIG. 5.

Turning now to FIG. 6, a flow chart of a host channel transmission is depicted. In step 600, it may be determined whether there are command data to be transmitted. If this is not the case, it may be determined in step 610 whether there are response data to be transmitted. If not, the processing scheme may return to step 600. If there are response data to be transmitted, a corresponding response transmission may be performed in step 640. This will be explained in more detail with respect to FIG. 8.

If step 600 yields that there are command data to be transmitted, it may be determined in step 620 whether there are response data to be transmitted which are preferred in view of the command data to be transmitted. If this is the case, the preferred response data may be transmitted in step 640. If not, the command data may be transmitted in step 630.

Figure 7:
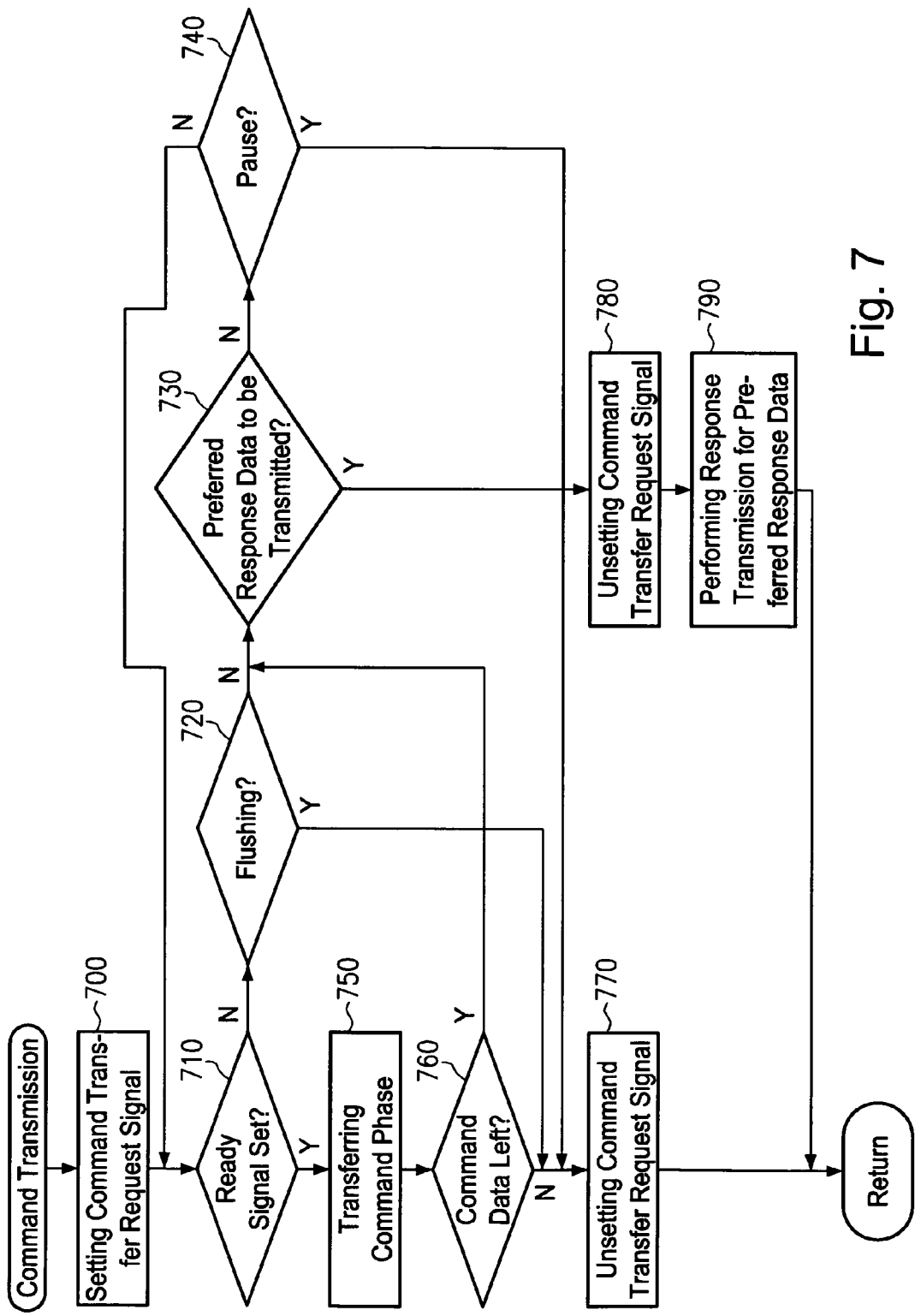
FIG. 7 is a flow chart illustrating the step of performing a downstream command transmission of FIG. 6 in more detail.

FIG. 7 shows a flow diagram illustrating the command transmission step 630 of FIG. 6. In step 700, the command transfer request signal may be set on the command transfer signal line 315. In step 710, it may be determined whether on the ready signal line 550 there is a ready signal set. If this is the case, one phase of command data may be transferred in step 750. Subsequently it may be determined in step 760 whether there are command data left that are to be transmitted. If not, the command transfer request signal may be unset in step 770 and the command transmission may be complete at this point.

If step 710 yields that the ready signal is not set, it may be determined in step 720 whether the flush request signal is asserted on the flush request signal line 560. If so, the command transmission scheme may proceed to step 770. If the flush request signal is not set, it may be determined in step 730 whether there are response data to be transmitted that are preferred in view of the command data to be transmitted. If there are preferred response data to be transmitted, the command transfer request signal may be unset in step 780, and instead of the command data, the preferred response data may be transmitted in step 790. This may be performed according to the response transmission scheme explained below with respect to FIG. 8.

If it is determined in step 730 that there are no preferred response data to be transmitted, it may be queried in step 740 whether the transmission is to be paused. If so, the command transmission scheme may proceed to step 770 for unsetting the command transfer request signal, otherwise the scheme may return to step 710. If step 760 yields that there are command data left that are to be transmitted, the command transmission scheme may proceed to step 730 for determining whether there are preferred response data to be transmitted.

Figure 8:
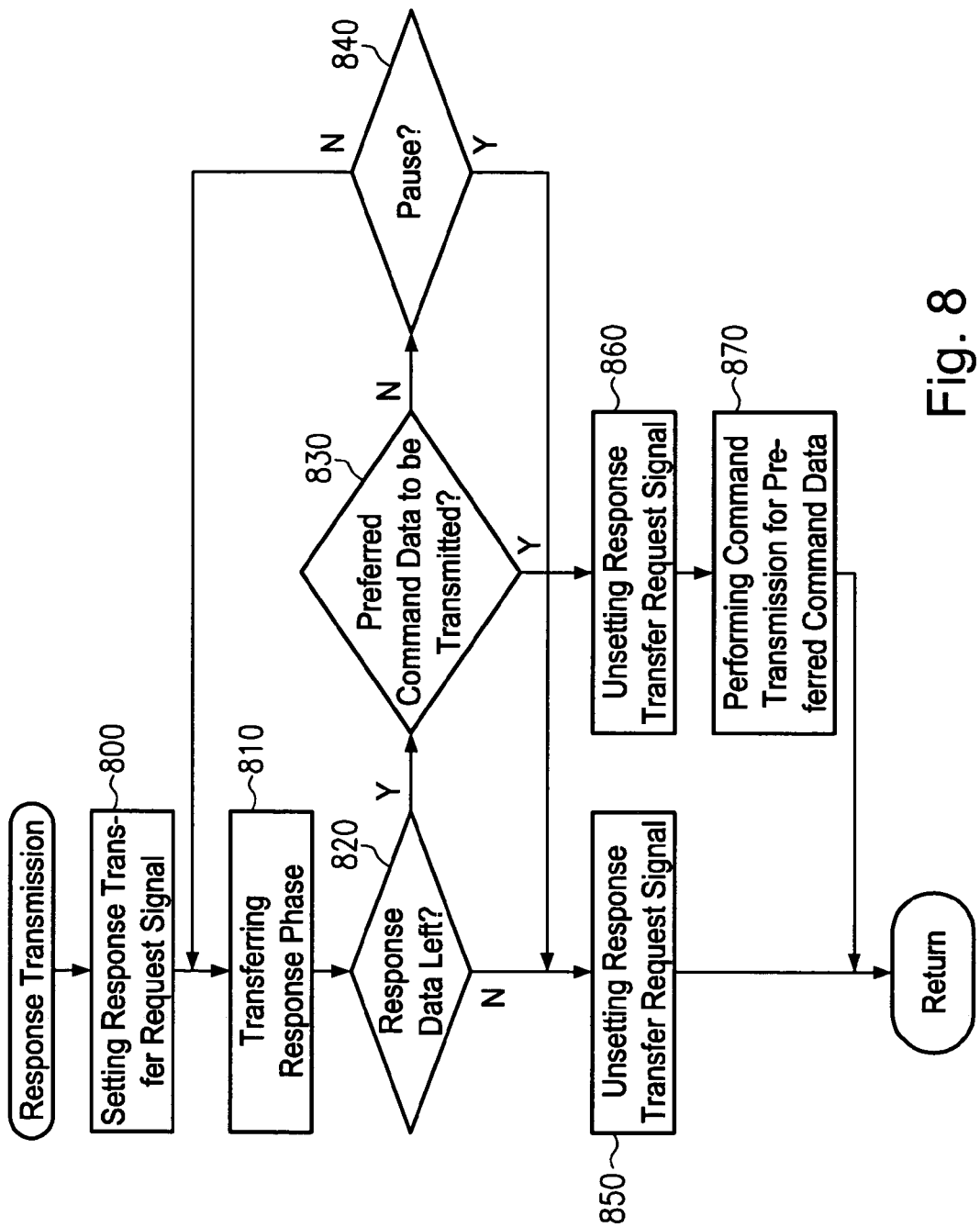
FIG. 8 is a flow chart illustrating the step of performing a downstream response transmission of FIG. 6 in more detail.

A response transmission scheme according to an embodiment is shown in the flow diagram of FIG. 8. The response transfer request signal may be set on the response transfer request signal line 325 in step 800. Then, in step 810, a response data phase may be transferred. In step 820, it may be determined whether there are response data left that are to be transferred. If not, the response transfer request signal may be de-asserted in step 850 and the response transmission may be complete at this point.

If step 820 yields that there are response data left, it may be determined in step 830 whether there are command data to be transmitted which are preferred in view of the response data to be transmitted. If so, the response transfer request signal may be unset in step 860 and the scheme may proceed with transmitting the preferred command data in step 870. This may be accomplished according to the above-described command transmission process of FIG. 7.

If it is determined in step 830 that there are no preferred command data to be transmitted, it may be detected in step 840 whether the response transmission is to be paused. If so, the response transmission scheme may proceed to step 840 for unsetting the response transfer request signal. Otherwise, the scheme may return to step 810 for transferring another response data phase.

It is noted that the sequence of steps shown in FIGS. 6, 7 and 8 has been chosen for illustration purposes only and is not to be understood as limiting the invention. For example, the queries 710 to 740 in FIG. 7 may be performed in a different order as well as the queries 820 to 840 in FIG. 8. Moreover, the role of command data and response data could be interchanged in FIG. 6.

Figure 9:
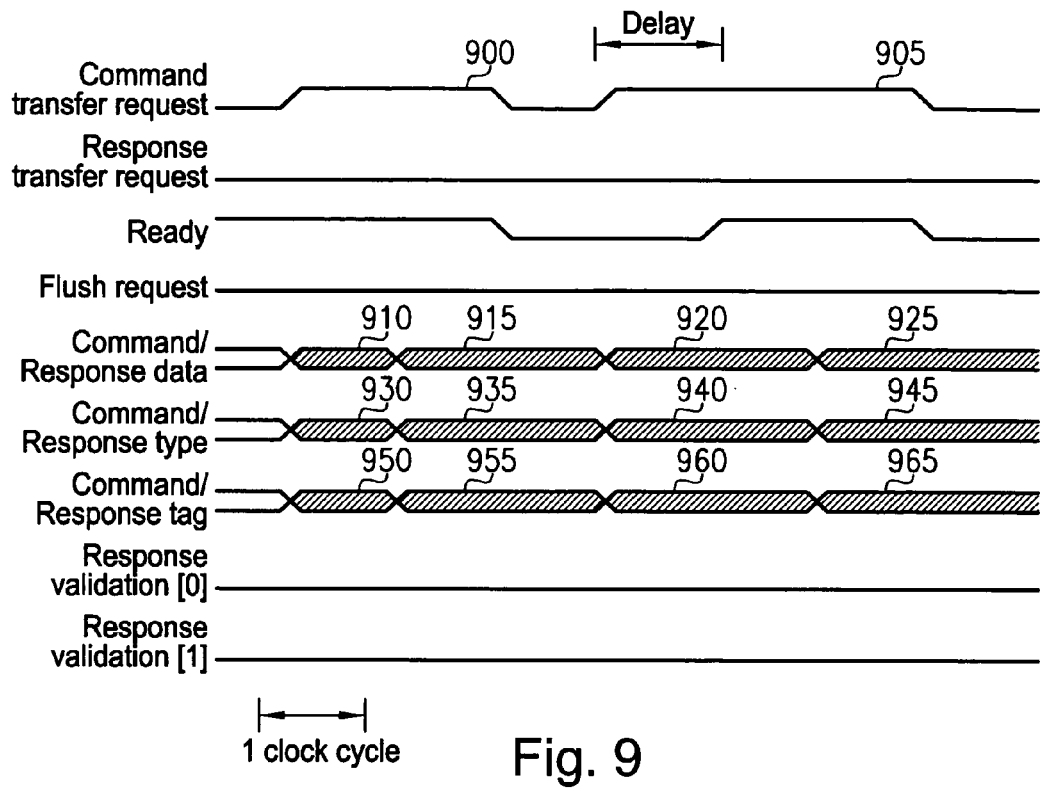
FIG. 9 is a wave form diagram illustrating wave forms that may occur when performing a downstream command transmission according to an embodiment.

Turning now to FIGS. 9 to 17, wave forms will be discussed in more detail that may occur when performing the process of host channel transmission. In FIG. 9, there are two read commands transmitted in cycles 900 and 905, respectively. In each cycle, address data 910, 920, command type data 930, 940, and command tag data 950, 960 followed by byte enables 915, 925, command information bits 935, 945, and the number of dwords to be read minus one 955, 965, respectively, are transmitted. As can be seen from FIG. 9, at the time the second cycle 905 starts, the ready signal is still down. In the example of FIG. 9, the device 345 sets the ready signal one clock later so that the device 345 delays the execution of the second cycle 905 by one clock period.

Figure 10:
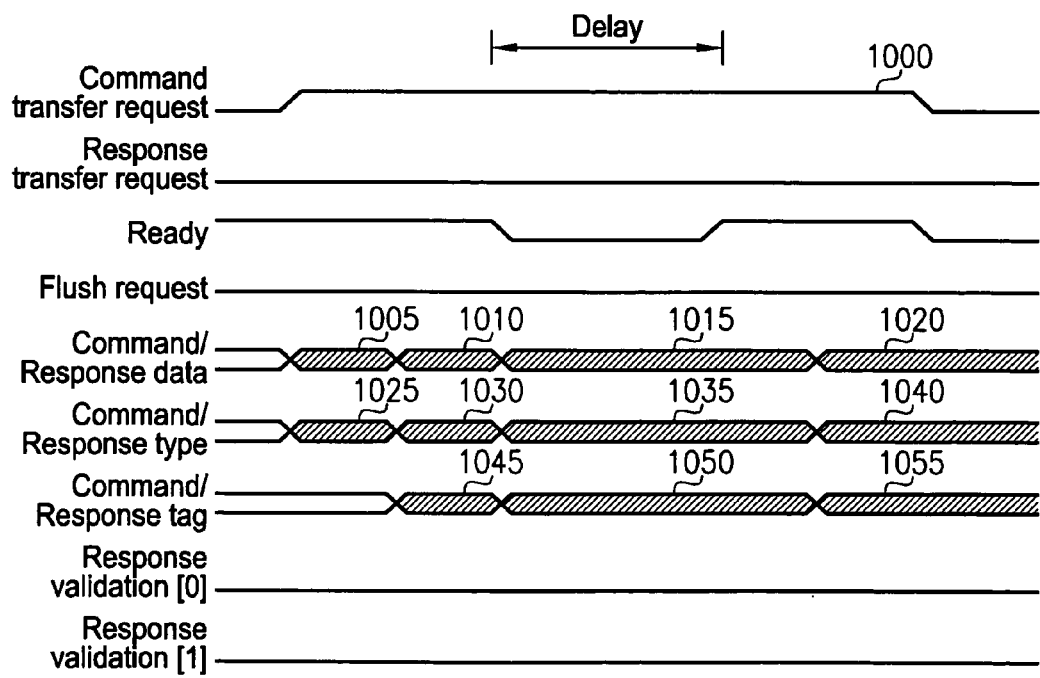
FIG. 10 is another wave form diagram pertaining to a downstream command transmission according to an embodiment.

In the example of FIG. 10, there is shown a single posted write cycle 1000 where following an address phase 1005, 1025, a first data phase 1010, 1030, 1045, a second data phase 1015, 1035, 1050, and a third data phase 1020, 1040, 1055 are transferred. After the host 300 has sent the first data phase 1010, 1030, 1045, the device 345 unsets the ready signal so that the second data phase 1015, 1035, 1050 is delayed by two clock cycles.

Figure 11:
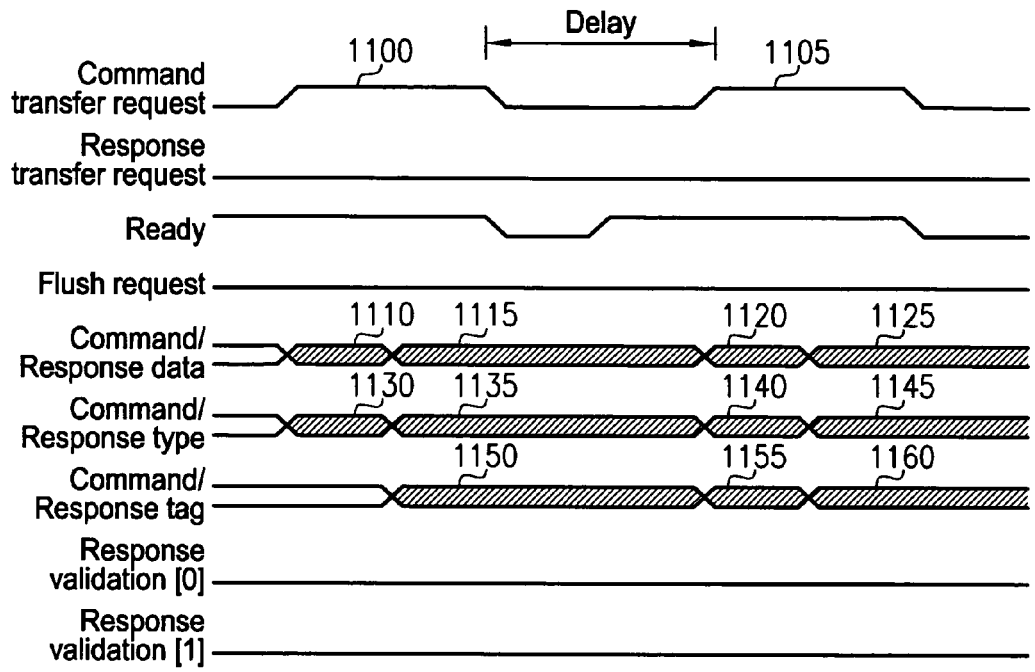
FIG. 11 is yet another wave form diagram for illustrating a downstream command transmission according to an embodiment.

The example of FIG. 11 shows one single posted write cycle where the host 300 and the device 345 delay the second data phase for two clocks. Once the address phase 1110, 1130 and the first data phase 1115, 1135, 1150 have been transmitted, the host 300 unsets the command transfer request signal 1100 and the device 345 also de-asserts the ready signal. The ready signal is re-asserted one clock cycle later, however the second data phase 1120, 1140, 1155 and a subsequent third data phase 1125, 1145, 1160 are only transmitted when the host 300 also resets the command transfer request signal 1105.

Figure 12:
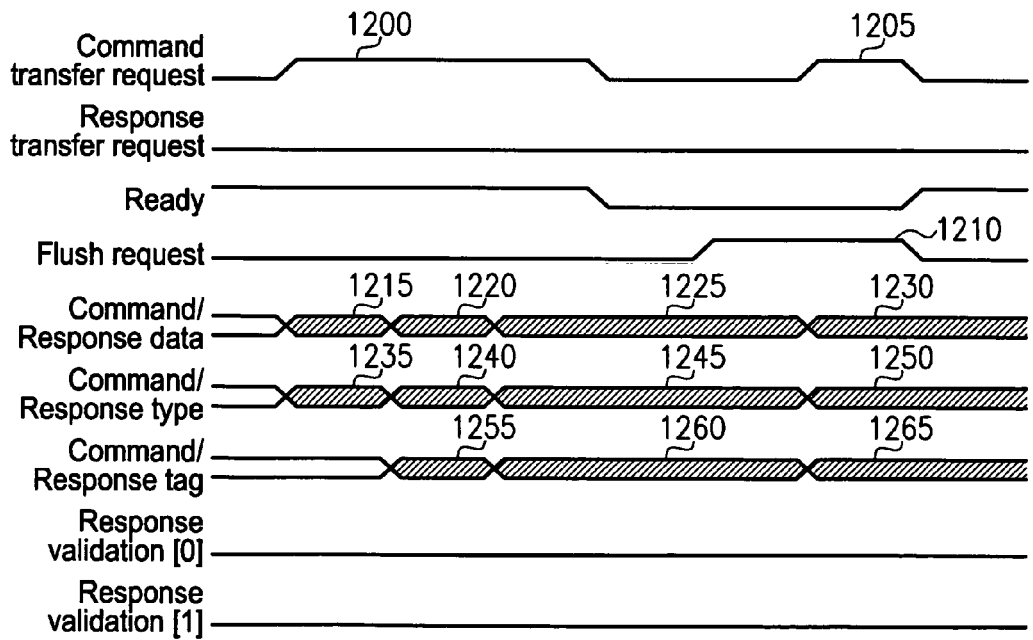
FIG. 12 is still another wave form diagram relating to a downstream command transmission according to an embodiment.

FIG. 12 depicts a single posted write cycle where the device 345 flushes subsequent data phases after the second one. While the command transfer request signal 1200 is set, the address phase 1215, 1235, a first data phase 1220, 1240, 1255, and a second data phase 1225, 1245, 1260 are transferred. Although the host 300 re-asserts the command transfer request signal 1205, a third data phase 1230, 1250, 1265 is flushed by the device 345 setting the flush request signal 1210.

Figure 13:
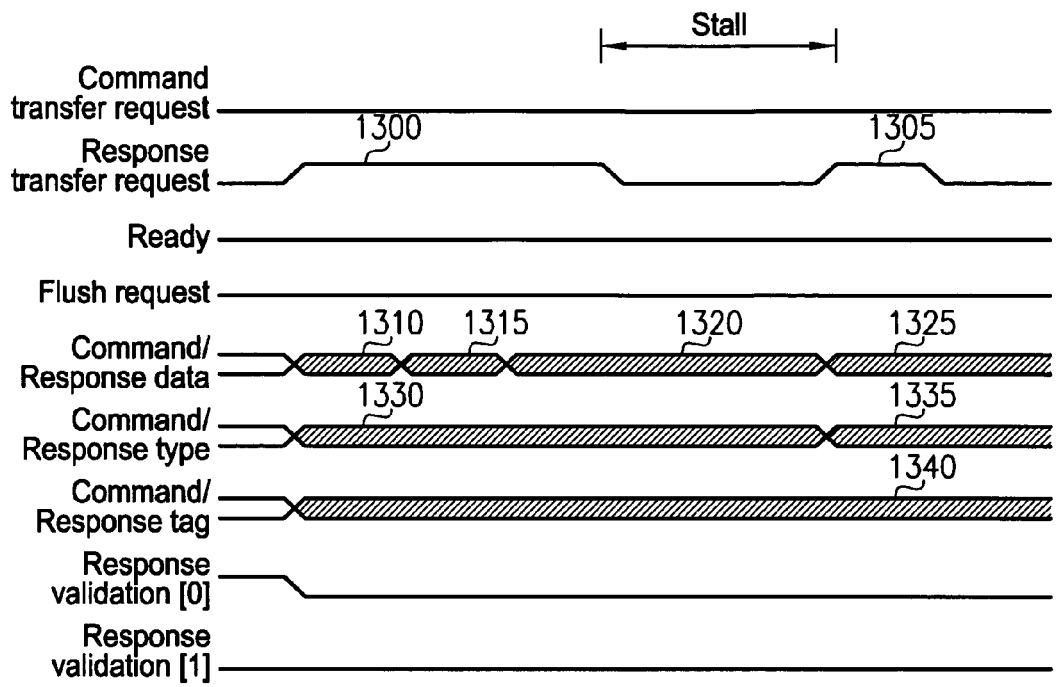
FIG. 13 is a wave form diagram illustrating wave forms that may occur when performing a downstream response transmission according to an embodiment.

FIG. 13 depicts a read response which is stalled by two clock cycles. While the host 300 asserts the response transfer request signal 1300, three subsequent data phases are transmitted. While the command/response data signal line holds one of the first data items 1310, the second data item 1315, and the third data item 1320 in each of the three data phases respectively, the command/response type signal line continuously holds a response status 1330 indicating that the current data phase is not the last data phase, and the command/response tag signal line continuously holds the response tag 1340 of the currently transmitted response. After a stall of two clock cycles, the response transfer request signal 1305 is re-asserted and, in a fourth data phase, a fourth data item 1325 is transmitted, the response status 1335 indicates that the fourth data phase is the last data phase, and the command/response tag signal line still holds the response tag 1340. During the stall, the response gets validated.

Figure 14:
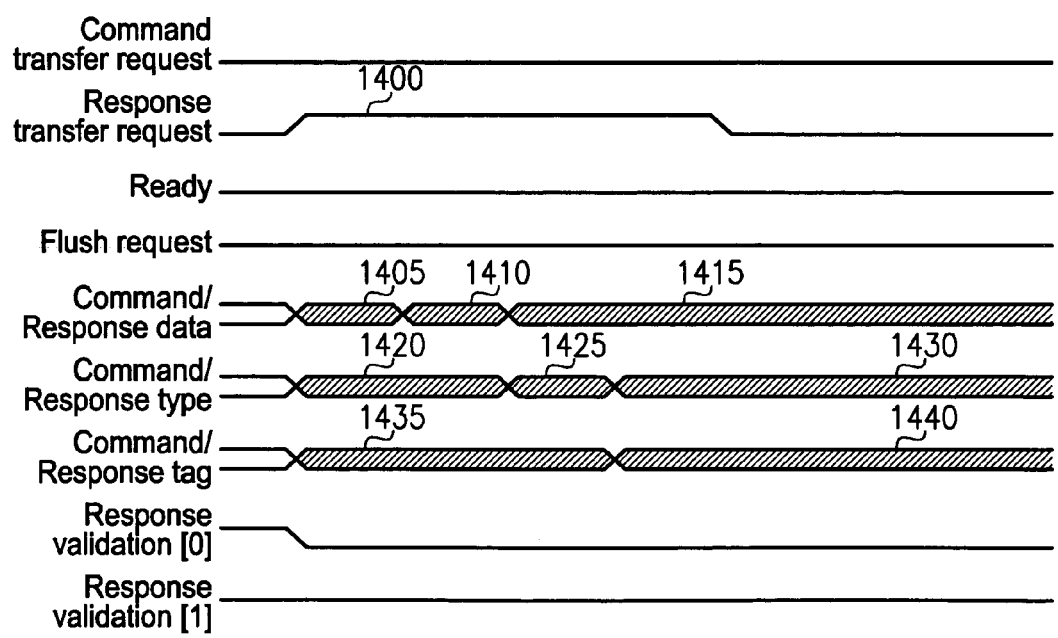
FIG. 14 is another wave form diagram pertaining to a downstream response transmission according to an embodiment.

FIG. 14 shows the case of back-to-back read and write responses where the first response gets validated later. While the response transfer request signal 1400 is set, three data phases 1405, 1410, 1415, 1420, 1425, 1435 of a read response are transmitted. Thereby, the response status 1425 indicates that the third data phase is the last data phase of the read response. In the next clock cycle in which the response transfer request signal 1400 is still asserted, a write response 1430, 1440 is transmitted.

Figure 15:
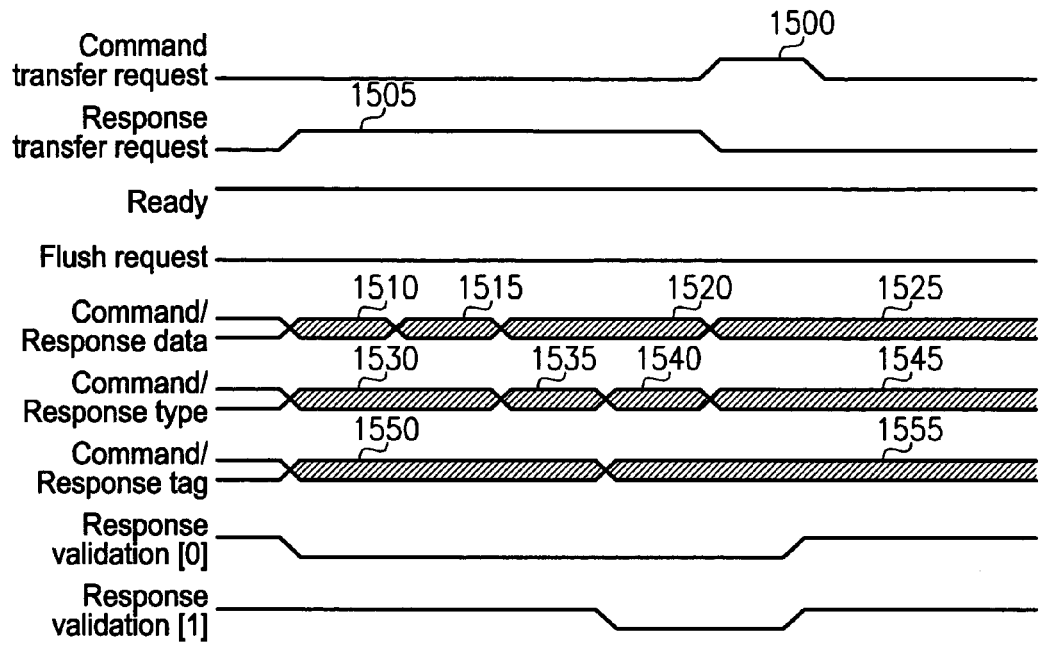
FIG. 15 is a wave form diagram illustrating wave forms that may occur when performing a downstream transmission according to an embodiment.

In the example of FIG. 15, two responses are transmitted which get validated at the same time. While the host 300 asserts the response transfer request signal 1505, three data phases of a first response 1510, 1515, 1520, 1530, 1535, 1550 as well as one data phase of a second response 1540, 1555 are transmitted. When the host 300 de-asserts the response transfer request signal 1505 and asserts the command transfer request signal 1500, the transmission of an address phase 1525, 1545, 1555 of a command is started.

Figure 16:
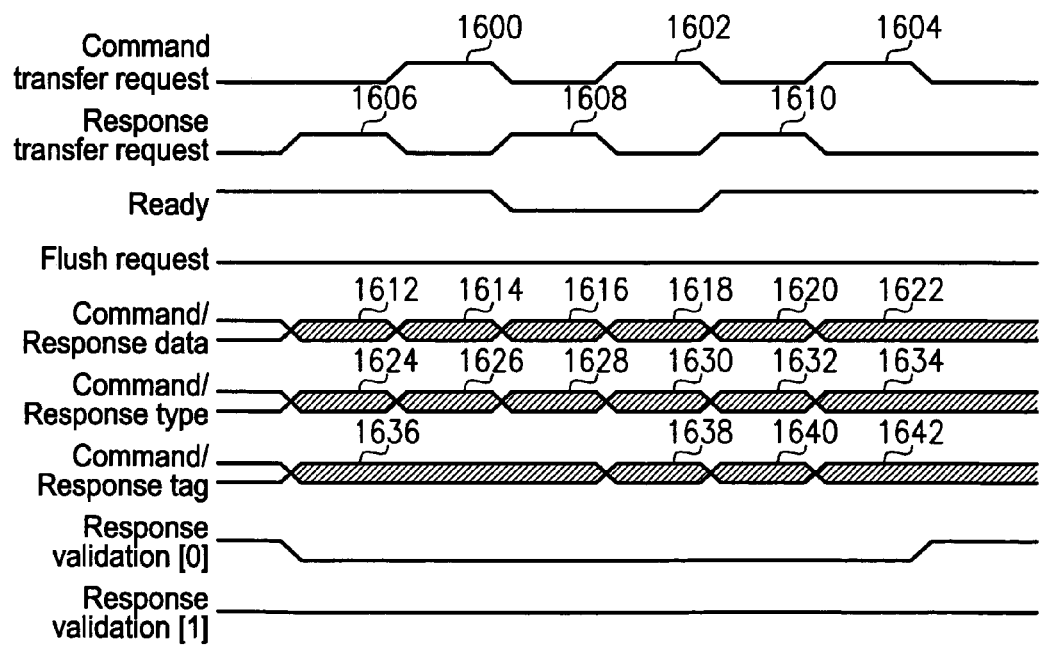
FIG. 16 is another wave form diagram pertaining to a downstream transmission according to an embodiment.

FIG. 16 shows the wave forms of a read response and an interleaved posted write command according to an embodiment. The command transfer request signal 1600, 1602, 1604 and the response transfer request signal 1606, 1608, 1610 are alternately asserted. While the response transfer request signal 1606 is asserted, a first data phase 1612, 1624, 1636 of the read response is transmitted. Then, during assertion of the command transfer request signal 1600, an address phase 1614, 1626, 1636 of the write command is sent, and during subsequent assertion of the response transfer request signal 1608, a second data phase 1616, 1628, 1638 of the read response is transferred. When the host 300 asserts the command transfer request signal 1602 the next time, it intends to transmit a data phase 1618, 1630, 1638 of the write command. However, at this time the ready signal is not set. Therefore, the information intended to be transmitted can only be sent the next time both the command transfer request signal 1604 and the ready signal are asserted, i.e. in the data phase 1622, 1634, 1642. In the meantime, a third data phase 1620, 1632, 1640 of the read response has been transmitted while the response transfer request signal 1610 was asserted.

Figure 17:
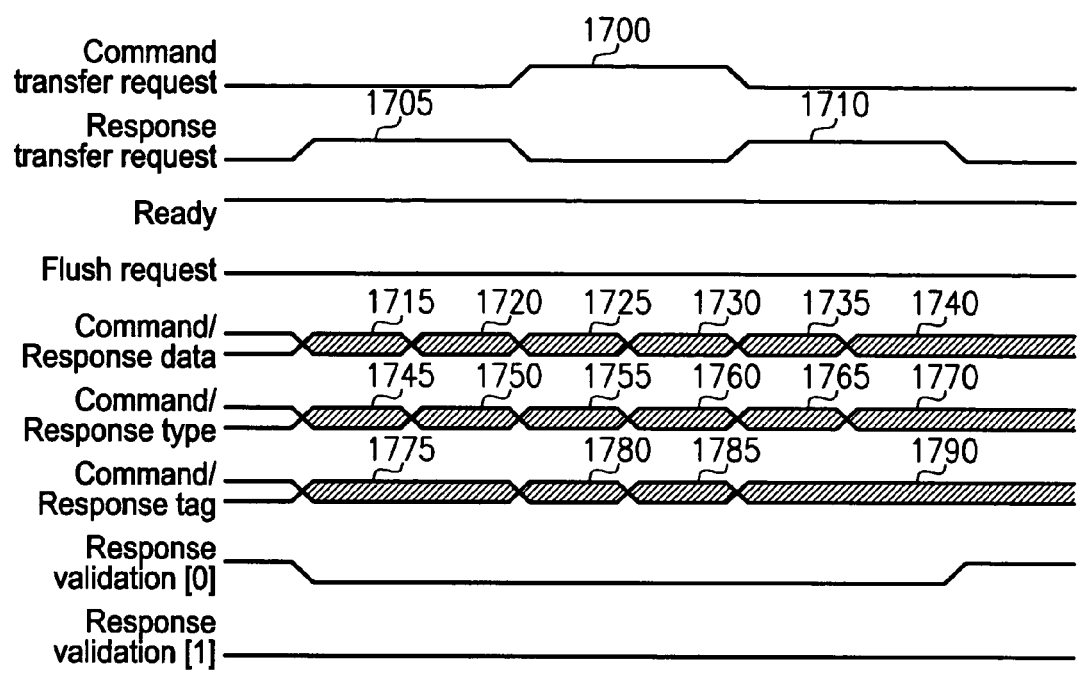
FIG. 17 is yet another wave form diagram for illustrating a downstream transmission according to an embodiment.

In FIG. 17, an example of a split read response and an interleaved non-posted read command is illustrated. While the host 300 asserts the response transfer request signal 1705, the first and second data phases 1715, 1720, 1745, 1750, 1775 of the read response are transferred. Thereby, the response status items 1745 and 1750 indicate that the response is not complete and that the response is a split response, respectively. During the time the response transfer request signal is de-asserted and the command transfer request signal 1700 is asserted, the data phase 1725, 1755, 1780 and the byte enable phase 1730, 1760, 1785 of the read command are transmitted. Then, by de-asserting the command transfer request signal 1700 and re-asserting the response transfer request signal 1710, the host 300 resumes the transmission of the split read response, i.e. transmits a third and a fourth data phase 1735, 1740, 1765, 1770, 1790.

As apparent from the above description of embodiments, a method to prevent double buffering by unhindered delivery of responses through interleaving has been presented. For efficient use of buffers, a requester of read data is to buffer the read responses. Many conventional implementations provide separate response and command interfaces to that requester so that the delivery of responses cannot be blocked, e.g., by write commands to that device. In order to save interface pins, the response and command interfaces have been merged according to the described embodiments.

Both responses and commands may have individual transaction enable signals, the described command transfer request and response transfer request signals, the assertion of which may determine the type of the current transactions. If a response is to be delivered, the command transfer request signal may be de-asserted at any stage of the transaction and the response transfer request signal may be asserted. Thus, unhindered delivery of responses may be guaranteed on a shared data bus.

The discussed embodiments may provide a response and command interleaving for, e.g., a low pin count packet-based internal bus. The described on-chip interface may be an internal high-speed interface express. Further, the presented techniques may be used in combination with AMD's 5537 chip set.

While reducing the internal interface width, the above embodiments may allow for maintaining optimized, i.e. minimal, buffer sizes. Therefore, the embodiments may improve both component density and efficiency and thus reduce manufacturing costs. While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An integrated circuit chip comprising a first and a second circuit unit, wherein:
    each of said first and second circuit units are capable of sending requests to the other one of said first and second circuit units;
    each of said first and second circuit units are further capable of sending back a response when receiving a request that requires a response; and
    said first circuit unit is connected to said second circuit unit to send to said second circuit unit request data relating to a request to be sent by said first circuit unit and response data relating to a response to be sent by said first circuit unit over a shared signal line, wherein one of said first circuit and said second circuit is capable of buffering said request data, and wherein the other one of said first circuit and said second circuit is not capable of buffering said request data.

2. The integrated circuit chip of claim 1, wherein said second circuit unit is further capable of receiving said request data and said response data over said shared signal line.

3. The integrated circuit chip of claim 1, wherein said first circuit unit is further capable of interleaving said request data and said response data.

4. The integrated circuit chip of claim 1, wherein said first circuit unit is further capable of buffering said request data.

5. The integrated circuit chip of claim 1, wherein said second circuit unit is not capable of buffering said request data.

6. The integrated circuit chip of claim 1, wherein said second circuit unit is further capable of buffering said response data.

7. The integrated circuit chip of claim 1, wherein said first circuit unit is not capable of buffering said response data.

8. The integrated circuit chip of claim 1, wherein said first circuit unit is further capable of delaying sending said request data.

9. The integrated circuit chip of claim 1, wherein said request data comprises at least two request data items to be sent sequentially; and
    wherein said first circuit unit is further capable of pausing sending said request data.

10. The integrated circuit chip of claim 1, wherein said first circuit unit is further capable of delaying sending said response data.

11. The integrated circuit chip of claim 1, wherein said response data comprises at least two response data items to be sent sequentially; and
    wherein said first circuit unit is further capable of pausing sending said response data.

12. The integrated circuit chip of claim 1, wherein said first circuit unit is further connected to said second circuit unit to provide to said second circuit unit a request enable signal over a request enable signal line; and
    wherein said request enable signal indicates whether said first circuit unit is sending said request data over said shared signal line.

13. The integrated circuit chip of claim 1, wherein said first circuit unit is further connected to said second circuit unit to provide to said second circuit unit a response enable signal over a response enable signal line; and
    wherein said response enable signal indicates whether said first circuit unit is sending said response data over said shared signal line.

14. The integrated circuit chip of claim 1, wherein said second circuit unit is further capable of causing said first circuit unit to delay sending said request data.

15. The integrated circuit chip of claim 14, wherein said second circuit unit is further connected to said first circuit unit to provide to said first circuit unit a control signal over a control signal line;
    wherein said control signal indicates whether said second circuit unit is ready for receiving said request data; and
    wherein said first circuit unit is further capable of checking said control signal and delaying sending said request data if said control signal indicates that said second circuit unit is not ready for receiving said request data.

16. The integrated circuit chip of claim 1, wherein said request data comprises at least two request data items to be sent sequentially; and
    wherein said second circuit unit is further capable of causing said first circuit unit to pause sending said request data.

17. The integrated circuit chip of claim 16, wherein said second circuit unit is further connected to said first circuit unit to provide to said first circuit unit a control signal over a control signal line;
    wherein said control signal indicates whether said second circuit unit is ready for receiving said request data; and
    wherein said first circuit unit is further capable of checking said control signal each time a request data item is to be sent and pausing sending said request data if said control signal indicates that said second circuit unit is not ready for receiving said request data.

18. The integrated circuit chip of claim 1, wherein said second circuit unit is not capable of causing said first circuit unit to delay sending said response data.

19. The integrated circuit chip of claim 1, wherein said response data comprises at least two response data items to be sent sequentially; and
wherein said second circuit unit is not capable of causing said first circuit unit to pause sending said response data.

20. The integrated circuit chip of claim 1, wherein said second circuit unit comprises a request Finite State Machine (FSM) unit for processing said request data and a response FSM unit for processing said response data; and
wherein said shared signal line is connected to said request FSM unit and to said response FSM unit.

21. The integrated circuit chip of claim 1, wherein said second circuit unit comprises a request FSM unit for processing said request data;
wherein said first circuit unit is farther connected to said second circuit unit to provide to said second circuit unit a request enable signal over a request enable signal line;
wherein said request enable signal indicates whether said first circuit unit is sending said request data over said shared signal line; and
wherein said request enable signal line is connected to said request FSM unit.

22. The integrated circuit chip of claim 1, wherein said second circuit unit comprises a response FSM unit for processing said response data;
wherein said first circuit unit is further connected to said second circuit unit to provide to said second circuit unit a response enable signal over a response enable signal line;
wherein said response enable signal indicates whether said first circuit unit is sending said response data over said shared signal line; and
wherein said response enable signal line is connected to said response FSM unit.

23. The integrated circuit chip of claim 1, wherein said first circuit unit is a host unit for providing a service to said second circuit unit.

24. The integrated circuit chip of claim 1 being a southbridge chip for use in a computer system.

25. The integrated circuit chip of claim 1 being part of a chipset for use in a computer system.

26. A southbridge device comprising an integrated circuit chip having a first and a second circuit unit, wherein:
each of said first and second circuit units are capable of sending requests to the other one of said first and second circuit units;
each of said first and second circuit units are further capable of sending back a response when receiving a request that requires a response; and
said first circuit unit is connected to said second circuit unit to send to said second circuit unit request data relating to a request to be sent by said first circuit unit and response data relating to a response to be sent by said first circuit unit over a shared signal line, wherein one of said first circuit and said second circuit is capable of buffering said request data, and wherein the other one of said first circuit and said second circuit is not capable of buffering said request data.

27. The southbridge device of claim 26, wherein said second circuit unit is further capable of receiving said request data and said response data over said shared signal line.

28. The southbridge device of claim 26, wherein said first circuit unit is further capable of interleaving said request data and said response data.

29. The southbridge device of claim 26, wherein said first circuit unit is further capable of buffering said request data.

30. The southbridge device of claim 26, wherein said second circuit unit is not capable of buffering said request data.

31. The southbridge device of claim 26, wherein said second circuit unit is further capable of buffering said response data.

32. The southbridge device of claim 26, wherein said first circuit unit is not capable of buffering said response data.

33. The southbridge device of claim 26, wherein said first circuit unit is further capable of delaying sending said request data.

34. The southbridge device of claim 26, wherein said request data comprises at least two request data items to be sent sequentially; and
wherein said first circuit unit is further capable of pausing sending said request data.

35. The southbridge device of claim 26, wherein said first circuit unit is further capable of delaying sending said response data.

36. The southbridge device of claim 26, wherein said response data comprises at least two response data items to be sent sequentially; and
wherein said first circuit unit is further capable of pausing sending said response data.

37. The southbridge device of claim 26, wherein said first circuit unit is further connected to said second circuit unit to provide to said second circuit unit a request enable signal over a request enable signal line; and
wherein said request enable signal indicates whether said first circuit unit is sending said request data over said shared signal line.

38. The southbridge device of claim 26, wherein said first circuit unit is further connected to said second circuit unit to provide to said second circuit unit a response enable signal over a response enable signal line; and
wherein said response enable signal indicates whether said first circuit unit is sending said response data over said shared signal line.

39. The southbridge device of claim 26, wherein said second circuit unit is further capable of causing said first circuit unit to delay sending said request data.

40. The southbridge device of claim 26, wherein said request data comprises at least two request data items to be sent sequentially; and
wherein said second circuit unit is further capable of causing said first circuit unit to pause sending said request data.

41. The southbridge device of claim 26, wherein said second circuit unit is not capable of causing said first circuit unit to delay sending said response data.

42. The southbridge device of claim 26, wherein said response data comprises at least two response data items to be sent sequentially; and
wherein said second circuit unit is not capable of causing said first circuit unit to pause sending said response data.

43. A method of operating an integrated circuit chip comprising a first and a second circuit unit, comprising:
sending requests from one of said first and second circuit units to the other one of said first and second circuit units; and
sending back a response from said other one of said first and second circuit units to said one of said first and second circuit units if said request requires a response;

wherein the method further comprises:
operating said first circuit unit to send to said second circuit unit request data relating to a request to be sent by said first circuit unit and response data relating to a response to be sent by said first circuit unit over a shared signal line;
operating one of said first circuit and said second circuit to buffer said request data; and
operating the other one of said first circuit and said second circuit not to buffer said request data.

44. The method of claim 43, further comprising operating said second circuit unit to receive said request data and said response data over said shared signal line.

45. The method of claim 43, further comprising operating said first circuit unit to interleave said request data and said response data.

46. The method of claim 43, further comprising operating said first circuit unit to buffer said request data.

47. The method of claim 43, further comprising operating said second circuit unit not to buffer said request data.

48. The method of claim 43, further comprising operating said second circuit unit to buffer said response data.

49. The method of claim 43, further comprising operating said first circuit unit not to buffer said response data.

50. The method of claim 43, further comprising operating said first circuit unit to delay sending said request data.

51. The method of claim 43, wherein said request data comprises at least two request data items to be sent sequentially; and
the method further comprising operating said first circuit unit to pause sending said request data.

52. The method of claim 43, further comprising operating said first circuit unit to delay sending said response data.

53. The method of claim 43, wherein said response data comprises at least two response data items to be sent sequentially; and
the method further comprising operating said first circuit unit to pause sending said response data.

54. The method of claim 43, further comprising operating said first circuit unit to provide to said second circuit unit a request enable signal over a request enable signal line; and
wherein said request enable signal indicates whether said first circuit unit is sending said request data over said shared signal line.

55. The method of claim 43, further comprising operating said first circuit unit to provide to said second circuit unit a response enable signal over a response enable signal line; and
wherein said response enable signal indicates whether said first circuit unit is sending said response data over said shared signal line.

56. The method of claim 43, further comprising operating said second circuit unit to cause said first circuit unit to delay sending said request data.

57. The method of claim 43, wherein said request data comprises at least two request data items to be sent sequentially; and
the method further comprising operating said second circuit unit to cause said first circuit unit to pause sending said request data.

58. The method of claim 43, further comprising operating said second circuit unit not to cause said first circuit unit to delay sending said response data.

59. The method of claim 43, wherein said response data comprises at least two response data items to be sent sequentially; and
the method further comprising operating said second circuit unit not to cause said first circuit unit to pause sending said response data.

* * * * *